(12) United States Patent
Milo et al.

(10) Patent No.: US 12,329,176 B2
(45) Date of Patent: Jun. 17, 2025

(54) COFFEE COMPOSITIONS

(71) Applicant: SOCIÉTÉ DES PRODUITS NESTLÉ S.A., Vevey (CH)

(72) Inventors: Christian Milo, Dublin, OH (US); Luigi Poisson, Courgevaux (CH); Yipin Zhou, Marysville, OH (US); Valerie Martine Jeanine Leloup, Orbe (CH); Shinichiro Morimoto, Hyogo (JP)

(73) Assignee: Societe des Produits Nestle S.A., Vevey (CH)

( * ) Notice: Subject to any disclaimer, the term of this patent is extended or adjusted under 35 U.S.C. 154(b) by 200 days.

(21) Appl. No.: 18/134,132

(22) Filed: Apr. 13, 2023

(65) Prior Publication Data

US 2023/0329270 A1    Oct. 19, 2023

Related U.S. Application Data

(60) Provisional application No. 63/331,012, filed on Apr. 14, 2022.

(51) Int. Cl.
*A23F 5/24*    (2006.01)
*A23F 5/36*    (2006.01)

(52) U.S. Cl.
CPC ............... *A23F 5/243* (2013.01); *A23F 5/36* (2013.01)

(58) Field of Classification Search
CPC .................................... A23F 5/24; A23F 5/36
See application file for complete search history.

(56) References Cited

U.S. PATENT DOCUMENTS

| | | | |
|---|---|---|---|
| 5,897,903 A | 4/1999 | Gerhard-Rieben et al. | |
| 6,149,957 A | 11/2000 | Mandralis et al. | |
| 11,350,645 B2 | 6/2022 | Sahai et al. | |
| 2016/0242430 A1 | 8/2016 | Daenzer-Alloncle et al. | |
| 2017/0000153 A1 | 1/2017 | Borland et al. | |
| 2017/0339985 A1* | 11/2017 | Fu ............................ | A23L 2/56 |
| 2017/0367366 A1* | 12/2017 | Pouzot ...................... | A23F 5/04 |
| 2022/0240534 A1* | 8/2022 | Beswick ................... | A23L 27/20 |
| 2023/0329272 A1* | 10/2023 | Milo ......................... | A23F 5/36 |

FOREIGN PATENT DOCUMENTS

JP    2018038367 A    3/2018

OTHER PUBLICATIONS

Translation for JP2018038367 published Mar. 15, 2018.*
International Search Report and Written Opinion to PCT/IB2023/053803 dated Aug. 10, 2023.

* cited by examiner

*Primary Examiner* — Anthony J Weier
(74) *Attorney, Agent, or Firm* — K&L Gates LLP

(57) ABSTRACT

Coffee compositions that are derived from medium- and high-yield extracts while also having improved taste and aroma. Processes for producing such coffee compositions are also shown.

15 Claims, No Drawings

COFFEE COMPOSITIONS

CROSS REFERENCE TO RELATED APPLICATIONS

The present application claims priority to provisional Patent Appl. Ser. No. 63/331,012 filed Apr. 14, 2022, the entire contents of which are incorporated herein by reference.

TECHNICAL FIELD

Embodiments of the present disclosure are generally directed to coffee compositions and, in particular, coffee compositions that are derived from medium- and high-yield extracts while also having improved taste and aroma.

BACKGROUND

Coffee compositions and, in particular, soluble coffee products are conventionally produced via the extraction of roast and ground coffee with water to produce an extract that includes water soluble coffee solids. The extract may then be concentrated via a suitable process (e.g., evaporation) to produce a liquid concentrate and/or dried via a suitable method (e.g., spray- or freeze-drying) to produce a soluble powder. Either the liquid concentrate or soluble powder may be diluted or reconstituted, respectively, via the addition of water to conveniently produce a coffee beverage. As expected, it is desirable that such coffee beverages have a taste similar to those prepared via the traditional brewing of roast and ground coffee. However, the industrial production of soluble coffee products is typically associated with temperatures and pressures that are significantly greater than those employed when brewing roast and ground coffee. While these temperatures and pressures afford a relatively greater yield of coffee solids, they may also result in the formation of undesirable flavor notes.

There has been a number of different solutions proposed to balance the yield of coffee solids and the preservation of desirable taste and aroma. For example, the counter-current extraction of soluble coffee solids (see, e.g., U.S. Pat. No. 5,897,903) utilizes a combination of relatively mild extraction conditions to reduce the formation of undesirable flavor notes and the hydrolysis of partially extracted coffee to increase yield. Some processes also utilize the stripping and collection of desirable aroma compounds from coffee prior to extraction, which can then be "added back" downstream (see, e.g., U.S. Pat. No. 6,149,957). However, these solutions are still unable to achieve the flavor profile of traditionally brewed coffee. As a result, yield may be considered as a limiting factor for the achievable taste and aroma.

SUMMARY

Accordingly, there is an ongoing need for coffee compositions that provide a balance between yield and flavor. In particular, there is an ongoing need for coffee compositions that are derived from medium- and high-yield extracts while also having improved taste and aroma.

According to at least one embodiment of the present disclosure, a coffee composition may include furfuryl alcohol, pyridine, and one or more monosaccharides. A ratio of concentrations of the furfuryl alcohol to the pyridine may be greater than or equal to 30. A total sum of the concentrations of the monosaccharides may be greater than or equal to 18 wt. %.

According to at least one other embodiments of the present disclosure, a coffee composition may include one or more monosaccharides in an amount greater than or equal to 18 wt. %. The coffee composition may further include one or more alkylpyrazines having an absolute content greater than or equal to 50.0, furfuryl alcohol having an absolute content greater than or equal to 2,000, or one or more N-heterocycles greater than or equal to 2.70.

Additional features and advantages of the present disclosure will be set forth in the detailed description that follows and, in part, will be readily apparent to a person of ordinary skill in the art from the detailed description or recognized by practicing the aspects of the present disclosure.

DETAILED DESCRIPTION

As noted previously, the present disclosure is generally directed to coffee compositions and, in particular, coffee compositions that are derived from medium- and high-yield extracts while also having improved taste and aroma. Consequently, the present disclosure is directed to—at least in part—coffee compositions including both particular concentrations of one or more carbohydrates and aroma compounds. As will be described in more detail, the carbohydrate concentrations of a coffee composition may be used as a measure of the yield of the extract it was derived from and the aroma compound concentrations may be used as a measure of the taste and aroma.

Extracts (whether or not they have been concentrated and/or dried) are commonly classified based on their final extraction yield. As used in the present disclosure, "extraction yield" refers to the wt. % of soluble coffee solids extracted from the roast and ground coffee. For example, an extract having an extraction yield of 50% refers to an extract that includes 50 wt. % of the soluble coffee solids of the roast and ground coffee. "Soluble coffee solids" refers to all solids contained within the coffee matrix that are extractable with water. This includes, but is not limited to, carbohydrates, proteins, coffee alkaloids (e.g., caffeine), trigonelline, organic acids (e.g. citric, malic, acetic, and quinic acids), chlorogenic acids and their derivatives, inorganic acids, and salts. For the purposes of the present disclosure, extracts may be classified as low-yield (i.e., extracts having an extraction yield less than 30%), medium-yield (i.e., extracts having an extraction yield from 30% to 45%), and high-yield (i.e., extracts having an extraction yield greater than 45%).

Additionally, without being bound by any particular theory, it is believed that the extraction yield of an extract directly correlates with the concentrations of carbohydrates in the extract. Put more simply, the extraction yield of an extract may be determined by the concentrations of one or more carbohydrates in the extract. Accordingly, concentrations of one or more carbohydrates in the coffee composition may be the same or similar to those typical of medium- or high-yield extracts. For the purposes of the present disclosure, the concentrations of carbohydrates of a composition may be expressed as concentrations of one or more monosaccharides—as determined after acid hydrolysis—based on the dry weight of the composition.

In embodiments, a total sum of the concentrations of monosaccharides in the coffee composition may be greater than or equal to 18 wt. %, such as greater than or equal to 22 wt. %, greater than or equal to 26 wt. %, greater than or equal to 30 wt. %, greater than or equal to 34 wt. %, greater than or equal to 38 wt. %, or greater than or equal to 42 wt. %, based on the dry weight of the coffee composition. For example, a total sum of the concentrations of monosaccharides in the coffee composition may be from 18 wt. % to 46 wt. %, such as from 18 wt. % to 42 wt. %, from 18 wt. % to 38 wt. %, from 18 wt. % to 34 wt. %, from 18 wt. % to 30 wt. %, from 18 wt. % to 26 wt. %, from 18 wt. % to 22 wt. %, from 22 wt. % to 46 wt. %, from 22 wt. % to 42 wt. %, from 22 wt. % to 38 wt. %, from 22 wt. % to 34 wt. %, from 22 wt. % to 30 wt. %, from 22 wt. % to 26 wt. %, from 26 wt. % to 46 wt. %, from 26 wt. % to 42 wt. %, from 26 wt. % to 38 wt. %, from 26 wt. % to 34 wt. %, from 26 wt. % to 30 wt. %, from 30 wt. % to 46 wt. %, from 30 wt. % to 42 wt. %, from 30 wt. % to 38 wt. %, from 30 wt. % to 34 wt. %, from 34 wt. % to 46 wt. %, from 34 wt. % to 42 wt. %, from 34 wt. % to 38 wt. %, from 38 wt. % to 46 wt. %, from 38 wt. % to 42 wt. %, or from 42 wt. % to 46 wt. %, based on the dry weight of the coffee composition. The monosaccharides of the coffee composition may specifically include arabinose, galactose, glucose, xylose, mannose, fructose, sucrose, or some combination thereof. That is, a total sum of the concentrations of monosaccharides in the coffee composition may include one or more of arabinose, galactose, glucose, xylose, mannose, fructose, and sucrose.

In embodiments, the coffee composition may include mannose in an amount greater than or equal to 8 wt. %, such as greater than or equal to 10 wt. %, greater than or equal to 12 wt. %, greater than or equal to 14 wt. %, greater than or equal to 16 wt. %, greater than or equal to 18 wt. %, greater than or equal to 20 wt. %, greater than or equal to 22 wt. %, or greater than or equal to 24 wt. %, based on the dry weight of the coffee composition. For example, the coffee composition may include mannose in an amount from 8 wt. % to 26 wt. %, such as from 8 wt. % to 24 wt. %, from 8 wt. % to 22 wt. %, from 8 wt. % to 20 wt. %, from 8 wt. % to 18 wt. %, from 8 wt. % to 16 wt. %, from 8 wt. % to 14 wt. %, from 8 wt. % to 12 wt. %, from 8 wt. % to 10 wt. %, from 10 wt. % to 26 wt. %, from 10 wt. % to 24 wt. %, from 10 wt. % to 22 wt. %, from 10 wt. % to 20 wt. %, from 10 wt. % to 18 wt. %, from 10 wt. % to 16 wt. %, from 10 wt. % to 14 wt. %, from 10 wt. % to 12 wt. %, from 12 wt. % to 26 wt. %, from 12 wt. % to 24 wt. %, from 12 wt. % to 22 wt. %, from 12 wt. % to 20 wt. %, from 12 wt. % to 18 wt. %, from 12 wt. % to 16 wt. %, from 12 wt. % to 14 wt. %, from 14 wt. % to 26 wt. %, from 14 wt. % to 24 wt. %, from 14 wt. % to 22 wt. %, from 14 wt. % to 20 wt. %, from 14 wt. % to 18 wt. %, from 16 wt. % to 26 wt. %, from 16 wt. % to 24 wt. %, from 16 wt. % to 22 wt. %, from 16 wt. % to 20 wt. %, from 16 wt. % to 18 wt. %, from 18 wt. % to 26 wt. %, from 18 wt. % to 24 wt. %, from 18 wt. % to 22 wt. %, from 18 wt. % to 20 wt. %, from 20 wt. % to 26 wt. %, from 20 wt. % to 24 wt. %, from 20 wt. % to 22 wt. %, from 22 wt. % to 26 wt. %, from 22 wt. % to 24 wt. %, or from 24 wt. % to 26 wt. %, based on the dry weight of the coffee composition.

In embodiments, the coffee composition may include arabinose in an amount greater than or equal to 2 wt. %, such as greater than or equal to 3 wt. %, greater than or equal to 4 wt. %, or greater than or equal to 5 wt. % based on the total weight of the coffee composition. For example, the coffee composition may include arabinose in an amount from 2 wt. % to 6 wt. %, such as from 2 wt. % to 5 wt. %, from 2 wt. % to 4 wt. %, from 2 wt. % to 3 wt. %, from 3 wt. % to 6 wt. %, from 3 wt. % to 5 wt. %, from 3 wt. % to 4 wt. %, from 4 wt. % to 6 wt. %, from 4 wt. % to 5 wt. %, or from 5 wt. % to 6 wt. %, based on the dry weight of the coffee composition.

In embodiments, the coffee composition may include galactose in an amount greater than or equal to 8 wt. %, such as greater than or equal to 10 wt. %, greater than or equal to 12 wt. %, greater than or equal to 14 wt. %, greater than or equal to 16 wt. %, or greater than or equal to 18 wt. %, based on the dry weight of the coffee composition. For example, the coffee composition may include galactose in an amount from 8 wt. % to 20 wt. %, such as from 8 wt. % to 20 wt. %, from 8 wt. % to 18 wt. %, from 8 wt. % to 16 wt. %, from 8 wt. % to 14 wt. %, from 8 wt. % to 12 wt. %, from 8 wt. % to 10 wt. %, from 10 wt. % to 20 wt. %, from 10 wt. % to 18 wt. %, from 10 wt. % to 16 wt. %, from 10 wt. % to 14 wt. %, from 10 wt. % to 12 wt. %, from 12 wt. % to 20 wt. %, from 12 wt. % to 18 wt. %, from 12 wt. % to 16 wt. %, from 12 wt. % to 14 wt. %, from 14 wt. % to 20 wt. %, from 14 wt. % to 18 wt. %, from 14 wt. % to 16 wt. %, from 16 wt. % to 20 wt. %, from 16 wt. % to 18 wt. %, or from 18 wt. % to 20 wt. % based on the dry weight of the coffee composition.

In embodiments, the sum of the concentrations of arabinose and galactose in the coffee composition may be greater than or equal to 10 wt. %, such as greater than or equal to 12 wt. %, greater than or equal to 14 wt. %, greater than or equal to 16 wt. %, greater than or equal to 18 wt. %, greater than or equal to 20 wt. % z, greater than or equal to 22 wt. %, or greater than or equal to 24 wt. %, based on the dry weight of the coffee composition. For example, the sum of the concentrations of arabinose and galactose in the coffee composition may be from 10 wt. % to 26 wt. %, such as from 10 wt. % to 24 wt. %, from 10 wt. % to 22 wt. %, from 10 wt. % to 20 wt. %, from 10 wt. % to 18 wt. %, from 10 wt. % to 16 wt. %, from 10 wt. % to 14 wt. %, from 10 wt. % to 12 wt. %, from 12 wt. % to 26 wt. %, from 12 wt. % to 24 wt. %, from 12 wt. % to 22 wt. %, from 12 wt. % to 20 wt. %, from 12 wt. % to 18 wt. %, from 12 wt. % to 16 wt. %, from 12 wt. % to 14 wt. %, from 14 wt. % to 26 wt. %, from 14 wt. % to 24 wt. %, from 14 wt. % to 22 wt. %, from 14 wt. % to 20 wt. %, from 14 wt. % to 18 wt. %, from 14 wt. % to 16 wt. %, from 16 wt. % to 26 wt. %, from 16 wt. % to 24 wt. %, from 16 wt. % to 22 wt. %, from 16 wt. % to 20 wt. %, from 16 wt. % to 18 wt. %, from 18 wt. % to 26 wt. %, from 18 wt. % to 24 wt. %, from 18 wt. % to 22 wt. %, from 18 wt. % to 20 wt. %, from 20 wt. % to 26 wt. %, from 20 wt. % to 24 wt. %, from 20 wt. % to 22 wt. %, from 22 wt. % to 26 wt. %, from 22 wt. % to 24 wt. %, or from 24 wt. % to 26 wt. %, based on the dry weight of the coffee composition.

As noted previously, the coffee composition may be derived from medium- and high-yield extracts while having improved taste and aroma compared to conventional coffee compositions derived from medium- and high-yield extracts. This improved flavor may be confirmed by aroma chemistry. Put more simply, the coffee composition may have increased concentrations of desirable aroma compounds when compared to conventional coffee compositions derived from similar-yield extracts. For example, the coffee composition may have a concentration of furfuryl alcohol greater than conventional coffee compositions derived from similar-yield extracts. For the purposes of the present disclosure, the concentrations of aroma compounds may be expressed as the absolute content of the aroma compounds in a composition, which refers to the mass of the aroma compounds in milligrams (mg) relative to the total mass of the soluble coffee solids of the composition in kilograms (kg).

The absolute content of furfuryl alcohol in the coffee composition may be greater than or equal to 2,000 mg/kg of soluble coffee solids, such as greater than or equal to 2,100, greater than or equal to 2,200, greater than or equal to 2,300, greater than or equal to 2,400, greater than or equal to 2,500, greater than or equal to 2,600, greater than or equal to 2,700, greater than or equal to 2,800, greater than or equal to 2,900, or greater than or equal to 3,000 mg/kg of soluble coffee solids. For example, the absolute content of furfuryl alcohol in the coffee composition may be from 2,000 to 3,000 mg/kg of soluble coffee solids, such as from 2,000 to 2,800, from 2,000 to 2,600, from 2,000 to 2,400, from 2,000 to 2,200, from 2,200 to 3,000, from 2,200 to 2,800, from 2,200 to 2,600, from 2,200 to 2,400, from 2,400 to 3,000, from 2,400 to 2,800, from 2,400 to 2,600, from 2,600 to 3,000, from 2,600 to 2,800, or from 2,800 to 3,000 mg/kg of soluble coffee solids.

The absolute content of alkyl pyrazines (i.e., the sum of 2-ethyl-6-methylpyrazine, 2-ethyl-5-methylpyrazine, 2-ethyl-3-methylpyrazine, 2,3,5-trimethylpyrazine, 2-ethyl-3,6-dimethylpyrazine, 2-ethyl-3,5-dimethylpyrazine, and 2,3-diethyl-5-methylpyrazine) in the coffee composition may be greater than or equal to 50.0 mg/kg of soluble coffee solids, such as greater than or equal to 60.0, greater than or equal to 70.0, greater than or equal to 80.0, greater than or equal to 90.0, greater than or equal to 100.0, or greater than or equal to 110.0 mg/kg of soluble coffee solids. For example, the absolute content of alkyl pyrazines in the coffee composition may be from 50.0 to 120.0 mg/kg of soluble coffee solids, such as from 50.0 to 110.0, from 50.0 to 100.0, from 50.0 to 90.0, from 50.0 to 80.0, from 50.0 to 70.0, from 50.0 to 60.0, from 60.0 to 120.0, from 60.0 to 110.0, from 60.0 to 100.0, from 60.0 to 90.0, from 60.0 to 80.0, from 60.0 to 70.0, from 70.0 to 120.0, from 70.0 to 110.0, from 70.0 to 100.0, from 70.0 to 90.0, from 70.0 to 80.0, from 80.0 to 120.0, from 80.0 to 110.0, from 80.0 to 100.0, from 80.0 to 90.0, from 90.0 to 120.0, from 90.0 to 110.0, from 90.0 to 100.0, from 100.0 to 120.0, from 100.0 to 110.0, or from 110.0 to 120.0 mg/kg of soluble coffee solids.

The absolute content of N-heterocycles (i.e., the sum of 2-acetylthiazole, 2-acetylpyrazine, and 2-acetylpyridine) in the coffee composition may be greater than or equal to 2.60 mg/kg of soluble coffee solids, such as greater than or equal to 3.00, greater than or equal to 3.40, greater than or equal to 3.80, greater than or equal to 4.20, greater than or equal to 4.60, greater than or equal to 5.00, greater than or equal to 5.40, greater than or equal to 5.80, greater than or equal to 6.20, greater than or equal to 6.60, or greater than or equal to 7.00 mg/kg of soluble coffee solids. For example, the absolute content of N-heterocycles in the coffee composition may be from 2.60 to 7.00 mg/kg of soluble coffee solids, such as from 2.60 to 7.00, from 2.60 to 6.20, from 2.60 to 5.40, from 2.60 to 4.60, from 2.60 to 3.80, from 2.60 to 3.40, from 2.60 to 3.00, from 3.00 to 7.00, from 3.00 to 6.20, from 3.00 to 5.40, from 3.00 to 4.60, from 3.00 to 3.80, from 3.80 to 7.00, from 3.80 to 6.20, from 3.80 to 5.40, from 3.80 to 4.60, from 4.60 to 7.00, from 4.60 to 6.20, from 4.60 to 5.40, from 5.40 to 7.00, from 5.40 to 6.20, or from 6.20 to 7.00 mg/kg of soluble coffee solids.

Without being bound by any particular theory, it is believed that alkyl pyrazines and N-heterocycles are useful aroma compounds when measuring the taste and aroma of a coffee composition, particularly how the taste and aroma of a coffee composition is affected by different processing techniques. In this regard, it is believed that the concentrations of alkyl pyrazines and N-heterocycles are relatively independent of the origin and blends of the coffee beans, as well as the roast conditions and final roast color of the coffee beans. Additionally, alkyl pyrazines and N-heterocycles are inefficiently stripped via aroma technology, are note formed during typical extraction cycles, and are quantitatively removed by common concentration techniques, such as thermal evaporation.

The coffee composition may also be described based on a ratio of two or more aroma compositions. In embodiments, the ratio of concentrations of 2-ethyl-6-methylpyrazine to 2-methylbutanal in the coffee composition may be greater than or equal to 0.65, such as greater than or equal to 0.80, greater than or equal to 0.95, greater than or equal to 1.10, greater than or equal to 1.25, greater than or equal to 1.40, greater than or equal to 1.55, greater than or equal to 1.70, or greater than or equal to 1.85. For example, the ratio of concentrations of 2-ethyl-6-methylpyrazine to 2-methylbutanal in the coffee composition may be from 0.65 to 2.15, such as from 0.65 to 1.85, from 0.65 to 1.55, from 0.65 to 1.25, from 0.65 to 0.95, from 0.95 to 2.15, from 0.95 to 1.85, from 0.95 to 1.55, from 0.95 to 1.25, or from 1.25 to 2.15.

In embodiments, the ratio of concentrations of the furfuryl alcohol to 2-methylbutanal in the coffee composition may be greater than or equal to 30, such as greater than or equal to 40, greater than or equal to 50, greater than or equal to 60, greater than or equal to 70, greater than or equal to 80, greater than or equal to 90, greater than or equal to 100, or greater than or equal to 110. For example, the ratio of concentrations of the furfuryl alcohol to 2-methylbutanal in the coffee composition may be from 30 to 110, such as from 30 to 90, from 30 to 70, from 30 to 50, from 50 to 110, from 50 to 90, from 50 to 70, from 70 to 110, from 70 to 90, or from 90 to 110.

In embodiments, the ratio of concentrations of the furfuryl alcohol to 2,3-butanedione in the coffee composition may be greater than or equal to 30, such as greater than or equal to 40, greater than or equal to 50, greater than or equal to 60, greater than or equal to 70, greater than or equal to 80, greater than or equal to 90, greater than or equal to 100, or greater than or equal to 110. For example, the ratio of concentrations of the furfuryl alcohol to 2,3-butanedione in the coffee composition may be from 30 to 110, such as from 30 to 90, from 30 to 70, from 30 to 50, from 50 to 110, from 50 to 90, from 50 to 70, from 70 to 110, from 70 to 90, or from 90 to 110.

The ratio of concentrations of the furfuryl alcohol to pyridine in the coffee composition may be greater than or equal to 30, such as greater than or equal to 35, greater than or equal to 40, greater than or equal to 45, greater than or equal to 50, greater than or equal to 55, greater than or equal to 60, greater than or equal to 65, or greater than or equal to 70. For example, the ratio of concentrations of the furfuryl alcohol to pyridine in the coffee composition may be from 30 to 70, such as from 30 to 60, from 30 to 50, from 30 to 40, from 40 to 70, from 40 to 60, from 40 to 50, from 50 to 70, from 50 to 60, or from 60 to 70.

The ratio of concentrations of the furfuryl alcohol to phenylacetaldehyde in the coffee composition may be greater than or equal to 150, such as greater than or equal to 175, greater than or equal to 200, greater than or equal to 225, greater than or equal to 250, greater than or equal to 275, greater than or equal to 300, greater than or equal to 325, greater than or equal to 350, greater than or equal to 375, greater than or equal to 400, or greater than or equal to 425. For example, the ratio of concentrations of the furfuryl alcohol to phenylacetaldehyde in the coffee composition may be from 150 to 450, such as from 150 to 400, from 150 to 350, from 150 to 300, from 150 to 250, from 150 to 200, from 200 to 450, from 200 to 400, from 200 to 350, from 200 to 300, from 200 to 250, from 250 to 450, from 250 to 400, from 250 to 350, from 250 to 300, from 300 to 450, from 300 to 400, from 300 to 350, from 350 to 450, from 350 to 400, or from 400 to 450.

The ratio of concentrations of the 2-acetylpyrazine to (E)-β-damascenone in the coffee composition may be greater than or equal to 40, such as greater than or equal to 55, greater than or equal to 70, greater than or equal to 85, greater than or equal to 100, greater than or equal to 115, greater than or equal to 130, greater than or equal to 145, or greater than or equal to 160. For example, the ratio of concentrations of the 2-acetylpyrazine to (E)-β-damascenone in the coffee composition may be from 40 to 175, such as from 40 to 145, from 40 to 115, from 40 to 85, from 85 to 175, from 85 to 145, from 85 to 115, from 115 to 175, from 115 to 145, or from 145 to 175.

In embodiments, the coffee composition may be a liquid concentrate intended to be mixed with water before consumption. In embodiments, the coffee extract according to the invention may be a dried coffee extract (e.g., a soluble coffee powder such as a pure soluble coffee powder). Soluble coffee is a phrase used to describe coffee which has been prepared by extraction of roast and ground coffee followed typically by drying of the extract into a powdered product by means such as freeze-drying or spray-drying. In order to prepare a coffee beverage, water is then simply added to the powder thus avoiding the complicated and time-consuming process which is involved when preparing a beverage from traditional roast and ground coffee. Although the material referred to as soluble coffee is predominantly comprised of soluble material there is usually a small amount of insoluble material present. It should be noted that a pure soluble coffee contains only materials derived from coffee.

Reference will now be made to processes suitable to produce the coffee composition. It should be noted that the coffee composition may be generally produced by concentrating an extract via forward osmosis to produce a liquid concentrate.

The extract may be produced via extraction from roast and ground coffee. Suitable processes for producing roast and ground coffee are known in the art. For example, the green coffee beans used to produce the roast and ground coffee may be arabica (*Coffea arabica*), robusta (*Coffea canephora*), or a blend of both. However, other coffee species known in the art may be suitable for use with the process of the present disclosure. Suitable processes for extraction are also known in the art. For example, the previously mentioned counter-current extraction process may be utilized to produce the extract.

The extract may be either a medium- or high-yield extract. That is, the extract may have an extraction yield greater than or equal to 30%. As a result, the concentrations of carbohydrates in the extract (expressed as concentrations of one or more monosaccharides—as determined after acid hydrolysis—based on the dry weight of the composition) may be the same or similar to those typical of medium- or high-yield extracts. The concentrations of these carbohydrates are the same as those described previously regarding the coffee composition.

The extract may then be concentrated to produce a concentrate. The concentration of the extract increases the total dissolved solids (TDS) of the extract and decreases the amount of water that must be removed during drying. The concentration process may increase the TDS of the extract from approximately 10% to greater than or equal to approximately 40%. There are a number of concentration processes known in the art. However, many of these processes (e.g., evaporation) include the application of heat, which can result in the removal of desirable aroma compounds from the extract. In order to avoid this undesirable application of heat, the extract may be concentrated via forward osmosis. Additionally, the extract may be concentrated by a combination of reverse and forward osmosis. For example, the TDS of the extract may be concentrated from approximately 10% to approximately 20% via reverse osmosis and then to greater than or equal to approximately 40% via forward osmosis. Examples of the use of reverse and forward osmosis to concentrate liquid food products can be found in, for example, U.S. patent application Ser. No. 15/775,540 and Japanese Patent No. 2018038367 A, respectively.

The concentrate may then be dried to produce a soluble powder. Suitable processes for drying the concentrate to produce a soluble powder are known in the art, including freeze and spray drying. In a typical freeze-drying process, the concentrate is frozen at a temperature from −20° C. to −40° C. before being heated under low-pressure conditions. This enables the frozen water component to be removed (e.g., via sublimation) without the need for temperatures that could degrade the flavor and other characteristics of the concentrate. Conversely, in a typical spray drying process, the concentrate is sprayed through a small nozzle into a heated drying gas, which produces dried particles that can be collected.

EXAMPLES

The various aspects of the embodiments of the present disclosure will be further clarified by the following examples. However, it should be noted that the examples are merely illustrative in nature and should not be understood to limit the subject matter of the present disclosure.

Example 1: Aroma Analysis

The absolute contents (mg/kg of soluble coffee solids) of aroma compounds of interest were quantified in 10 coffee composition samples after reconstitution in water using isotopically labelled standards in conjunction with solid phase microextraction and gas chromatography-mass spectrometry (SPME-GC-MS/MS) analysis. An overview of each coffee composition sample is provided in Table 1.

TABLE 1

Overview of Coffee Composition Samples

| Sample | A' | A | B' | B | C' | C | D' | D | E' | E |
|---|---|---|---|---|---|---|---|---|---|---|
| Blend [Arabica/Robusta %] | 100/0 | 100/0 | 100/0 | 100/0 | 100/0 | 100/0 | 60/40 | 60/40 | 100/0 | 100/0 |
| Roast Color [CTN] | 92 | 92 | 95 | 95 | 90 | 90 | 87 | 87 | 90 | 90 |
| Aroma Stripping & Add-Back | Yes | No | Yes | No | Yes | No | Yes | No | Yes | No |
| Extraction Yield [%] | 50% | 50% | 48% | 54% | 54% | 54% | 57% | 57% | 57% | 57% |

TABLE 1-continued

Overview of Coffee Composition Samples

| Sample | A' | A | B' | B | C' | C | D' | D | E' | E |
|---|---|---|---|---|---|---|---|---|---|---|
| Concentration Technology | EV | RO-FO | EV | RO-FO | EV | RO-FO | EV | FO | EV | FO |
| Drying | SD | SD | FD | FD | FD | FD | FD | FD | FD | FD |

EV: Evaporation;
RO: Reverse Osmosis;
FO: Forward Osmosis;
SD: Spray Drying;
FD: Freeze Drying Coffee Composition Sample Preparation Each coffee composition sample was placed into a silanised glass vial (standard 20 mL vials used for headspace/SPME analysis), solubilized with 5 mL of cold water, and spiked with defined quantities of labeled isotopes of the analytes. The vials were then sealed and stirred for 1 minute.

Aroma Extraction

Each coffee composition sample was first equilibrated for 60 minutes at room temperature. Aroma compounds were then extracted from the headspace by solid phase microextraction (SPME) at 40° C. over a duration of 10 minutes (2 cm fiber, 50/30 μm StableFlex, coated with PDMS/DVB/Carboxen; Supelco, Buchs, Switzerland), and thermally desorbed into the split-splitless injector (in split-mode; split of 2) heated at 240° C. for 10 minutes.

GC-MS/MS Analysis of Aroma Compounds

Separation was first carried out on a 60 m×0.25 mm×0.25 μm polar DB-624UI column (Agilent, Basel, Switzerland) using an Agilent 7890B gas chromatograph (Agilent, Basel, Switzerland). Helium was used as carrier gas with a constant flow of 1.2 mL/min. Following oven program was applied: initial temperature of 40° C. was held for 6 minutes, then raised to 240° C. at 6° C./min, and final temperature held for 10 minutes. Mass spectrometry was performed on an Agilent 7010 Triple Quad mass spectrometer (Agilent, Basel, Switzerland). Chromatograms were processed using the Agilent MassHunter software. The results are provided in Table 2.

TABLE 2

Absolute Contents of Selected Aroma Compounds of Coffee Composition Samples

| Sample | A' | A | B' | B | C' | C | D' | D | E' | E |
|---|---|---|---|---|---|---|---|---|---|---|
| 2-methylbutanal | 9.3 | 28.5 | 23.8 | 36.7 | 17.8 | 25.0 | 13.5 | 22.4 | 19.7 | 38.2 |
| 2,3-butanedione | 24.7 | 29.1 | 42.7 | 43.3 | 32.5 | 29.7 | 23.8 | 24.2 | 34.4 | 36.9 |
| (E)-β-damascenone | 0.023 | 0.029 | 0.044 | 0.026 | 0.036 | 0.020 | 0.016 | 0.028 | 0.035 | 0.028 |
| pyridine | 22.4 | 55.4 | 29.3 | 47.9 | 24.0 | 40.8 | 26.4 | 60.9 | 25.9 | 49.2 |
| 2-ethyl-6-methylpyrazine | 6.87 | 35.9 | 13.3 | 34.12 | 9.51 | 30.7 | 8.09 | 46.7 | 8.19 | 27.4 |
| 2-ethyl-5-methylpyrazine | 4.16 | 22.89 | 8.18 | 23.4 | 6.14 | 20.2 | 4.81 | 29.7 | 5.28 | 19.1 |
| 2,3,5-trimethylpyrazine | 0.99 | 6.18 | 1.75 | 6.49 | 1.22 | 4.83 | 0.99 | 7.42 | 1.10 | 5.16 |
| 2-ethyl-3-methylpyrazine | 1.55 | 7.50 | 3.48 | 9.47 | 2.01 | 5.87 | 1.87 | 11.6 | 2.04 | 6.86 |
| 2-ethyl-3,6-dimethylpyrazine | 1.48 | 8.73 | 2.46 | 8.25 | 1.62 | 5.65 | 1.85 | 12.7 | 1.50 | 7.06 |
| 2-ethyl-3,5-dimethylpyrazine | 0.21 | 0.76 | 0.30 | 0.81 | 0.28 | 0.66 | 0.27 | 1.12 | 0.163 | 0.57 |
| 2,3-diethyl-5-methylpyrazine | 0.037 | 0.134 | 0.064 | 0.117 | 0.050 | 0.091 | 0.060 | 0.232 | 0.048 | 0.116 |
| alkyl pyrazines[a] | 15.3 | 82.1 | 30.6 | 82.7 | 20.8 | 68.0 | 17.9 | 109.0 | 18.3 | 66.2 |
| furfurylalcohol | 652 | 2031 | 688 | 2260 | 646 | 2109 | 640 | 2466 | 729 | 2757 |
| 2-acetylthiazole | 0.07 | 0.46 | 0.11 | 0.45 | 0.10 | 0.38 | 0.06 | 0.40 | 0.09 | 0.49 |
| 2-acetylpyrazine | 0.49 | 1.72 | 0.44 | 1.61 | 0.83 | 3.32 | 0.57 | 2.04 | 1.21 | 3.51 |
| 2-acetylpyridine | 0.22 | 1.09 | 0.37 | 1.33 | 0.26 | 1.81 | 0.16 | 1.35 | 0.36 | 1.58 |
| N-heterocycles[b] | 0.78 | 3.27 | 0.92 | 3.39 | 1.19 | 5.51 | 0.79 | 3.79 | 1.66 | 5.58 |
| phenylacetaldehyde | 6.98 | 7.09 | 11.0 | 6.24 | 9.55 | 5.03 | 6.15 | 6.21 | 12.0 | 10.3 |
| Ratios | | | | | | | | | | |
| 2-ethyl-6-methylpyrazine/2-methylbutanal | 0.74 | 1.3 | 0.6 | 0.9 | 0.5 | 1.2 | 0.6 | 2.1 | 0.4 | 0.7 |
| furfurylalcohol/2-methylbutanal | 70 | 71 | 29 | 62 | 36 | 84 | 48 | 110 | 37 | 72 |
| furfurylalcohol/2,3-butanedione | 26 | 70 | 16 | 52 | 20 | 71 | 27 | 102 | 21 | 75 |
| furfurylalcohol/pyridine | 29 | 37 | 23 | 47 | 27 | 52 | 24 | 40 | 28 | 56 |
| furfurylalcohol/phenylacetaldehyde | 93 | 287 | 63 | 363 | 68 | 419 | 104 | 397 | 61 | 267 |
| 2-acetylpyrazine/(E)-β-damascenone | 21 | 60 | 10 | 62 | 23 | 163 | 35 | 72 | 35 | 124 |

[a]Sum of 2-ethyl-6-methylpyrazine; 2-ethyl-5-methylpyrazine; 2,3,5-trimethylpyrazine; 2-ethyl-3-methylpyrazine; 2-ethyl-3,6-dimethylpyrazine; 2-ethyl-3,5-dimethylpyrazine; and 2,3-diethyl-5-methylpyrazine
[b]Sum of 2-acetylthiazole; 2-acetylpyrazine; and 2-acetylpyridine

Example 2: Carbohydrate Analysis

The total carbohydrate compositions of 28 coffee composition samples were assessed after acid hydrolysis using high-performance anion exchange chromatography using pulsed amperometric detection (HPAEC-PAD), according to International Organization for Standardization (ISO) 11292-1995. First, 30 mg of each sample (in the form of a soluble coffee powder) were mixed with 200 μL of sulfuric acid [$H_2SO_4$; 72%] and pre-hydrolyzed at ambient temperature for 30 minutes. The volumes of the pre-hydrolyzed samples were then increased to 2.5 mL using distilled water and hydrolyzed at 100° C. for 2 hours. The neutralized samples were then cleaned on C18 cartridges and characterized via chromatography. The quantification of the carbohydrates (i.e., arabinose, galactose, mannose, and glucose) was performed using an external standard. The results are provided in Table 3 in addition to the extraction yield of each sample.

TABLE 3

Concentrations of Selected Monosaccharides of Coffee Composition Samples

| Sample | Extraction Yield [%] | Arabinose [wt. %] | Galactose [wt. %] | Glucose [wt. %] | Mannose [wt. %] | Total [wt. %] |
| --- | --- | --- | --- | --- | --- | --- |
| 1 | 34.32 | 2.76 | 9.06 | 0.57 | 11.88 | 24.27 |
| 2 | 55.89 | 3.49 | 14.45 | 0.83 | 17.46 | 36.24 |
| 3 | 57.27 | 3.58 | 15.71 | 0.69 | 15.73 | 35.71 |
| 4 | 56.49 | 3.24 | 13.96 | 0.65 | 16.41 | 34.25 |
| 5 | 57.58 | 3.32 | 14.38 | 0.77 | 15.98 | 34.45 |
| 6 | 52.42 | 3.34 | 13.84 | 0.92 | 18.38 | 36.48 |
| 7 | 52.42 | 3.27 | 13.76 | 0.91 | 18.95 | 36.89 |
| 8 | 54.74 | 3.34 | 13.61 | 0.86 | 18.59 | 36.40 |
| 9 | 58.90 | 3.34 | 14.98 | 0.70 | 15.82 | 34.84 |
| 10 | 20.40 | 2.80 | 5.88 | 1.13 | 6.51 | 16.31 |
| 11 | 28.60 | 3.04 | 5.51 | 3.11 | 2.72 | 14.38 |
| 12 | 24.70 | 2.97 | 5.98 | 1.58 | 4.68 | 15.21 |
| 13 | 16.30 | 2.92 | 7.02 | 1.40 | 3.84 | 15.18 |
| 14 | 17.90 | 2.57 | 3.92 | 1.16 | 5.48 | 13.13 |
| 15 | 20.30 | 2.17 | 4.45 | 0.86 | 7.19 | 14.67 |
| 16 | 17.20 | 2.64 | 3.78 | 2.46 | 2.92 | 11.79 |
| 17 | 16.80 | 2.61 | 3.36 | 1.48 | 1.60 | 9.05 |
| 18 | 24.4 | 2.07 | 4.23 | 1.10 | 4.10 | 11.49 |
| 19 | 18.80 | 2.27 | 5.35 | 0.95 | 5.27 | 13.84 |
| 20 | 17.20 | 3.23 | 6.22 | 1.63 | 3.06 | 14.14 |
| 21 | 16.20 | 2.69 | 3.66 | 2.65 | 1.98 | 10.96 |
| 22 | 16.80 | 2.75 | 5.58 | 0.86 | 4.35 | 13.53 |
| 23 | 19.00 | 3.42 | 6.27 | 1.82 | 3.15 | 14.66 |
| 24 | 23.90 | 2.43 | 5.34 | 0.80 | 5.72 | 14.28 |
| 25 | 24.20 | 2.36 | 7.29 | 0.82 | 7.52 | 17.98 |
| 26 | 43.10 | 2.26 | 12.66 | 0.70 | 12.72 | 28.34 |
| 27 | 55.70 | 3.72 | 17.74 | 0.77 | 11.48 | 33.70 |
| 28 | 18.60 | 2.34 | 5.10 | 0.82 | 5.81 | 14.08 |

Example 3: Concentration of Extract Via Forward Osmosis

A high-yield extract having a total solids content [Tc] of approximately 9-10% was concentrated to a Tc of approximately 40% via a bench-scale forward osmosis system using a 20-25% magnesium chloride [$MgCl_2$] draw solution. The extract was recirculated against the draw solution in the forward osmosis system until the target Tc of at least 40% was obtained.

The resulting concentrate was freeze-dried to produce a soluble powder and submitted for technical sensory analysis. When compared with a reference having the same extraction profile, but thermally concentrated via conventional methods, the concentrate was found to have a smoother taste and more caramel, nut, and almond flavors while also having less acidity, process notes, and harshness.

Example 4: Concentration of Extract Via Reverse and Forward Osmosis ($MgCl_2$)

A high-yield extract having a Tc of approximately 9-10% was first concentrated to a Tc of approximately 20% via reverse osmosis before being concentrated to a Tc of approximately 41% via forward osmosis in the same manner described in Example 3. The resulting concentrate was freeze-dried to produce a soluble powder and submitted for technical sensory analysis. The concentrate was found to have a smoother taste and enhanced caramel, nut, and almond flavors while also having less cooked notes and harshness. The concentrate was also found to have an increased overall taste compared to the concentrate of Example 3.

Example 5: Concentration of Extract Via Reverse and Forward Osmosis (NaCl)

A medium-yield extract having a Tc of approximately 9-10% was first concentrated to a Tc of approximately 20% via reverse osmosis before being concentrated to a Tc of approximately 41% via forward osmosis in the same manner described in Example 3, but using a 25% sodium chloride [NaCl] draw solution. The resulting concentrate was diluted to drinking strength and tasted against the forward osmosis feed (i.e., the reverse osmosis product with a Tc of approximately 20%) diluted to same strength. The sensory result was similar to those of Example 4, but with a smoother taste and increased nut and almond flavors while also having lower process notes and harshness. However, the concentrate was found to have a slightly decreased overall taste when compared to the concentrate of Example 4.

Example 6: Concentration of Extract Via Reverse and Forward Osmosis ($K_3C_6H_5O_7$)

A high-yield extract having a Tc of approximately 9-10% was first concentrated to a Tc of approximately 20% via reverse osmosis before being concentrated to a Tc of approximately 47% via forward osmosis in the same manner described in Example 3, but using an approximately 38% potassium citrate [$K_3C_6H_5O_7$] draw solution. The resulting concentrate was freeze-dried to produce a soluble powder and submitted for technical sensory analysis. The concentrate was found to have a smooth taste and pleasant nut and almond flavors while also having low process notes and harshness.

Having described the subject matter of the present disclosure in detail and by reference to certain embodiments, it should be noted that the various details of such embodiments should not be taken to imply that these details are essential components. Rather, the appended claims should be taken as the sole representation of the breadth of the present disclosure and the corresponding scope of the various embodiments described in the present disclosure. Further, it will be apparent that modifications and variations are possible without departing from the scope of the appended claims.

It should also be noted that any reference to prior art documents in this specification is not to be considered an admission that such prior art is widely known or forms part of the common general knowledge in the field. As used in this specification, the words "comprises", "comprising", and similar words, are not to be interpreted in an exclusive or exhaustive sense. In other words, they are intended to mean "including, but not limited to". Additionally, any two quantitative values assigned to a property may constitute a range of that property, and all combinations of ranges formed from all stated quantitative values of a given property are contemplated in the present disclosure.

The invention claimed is:

1. A coffee composition comprising furfuryl alcohol; pyridine; and one or more monosaccharides, wherein a ratio of concentrations of the furfurylalcohol to the pyridine is greater than or equal to 30; and a total sum of the concentrations of the one or more monosaccharides is greater than or equal to 18 wt. %.

2. The coffee composition of claim 1 further comprising 2-ethyl-6-methylpyrazine, 2-ethyl-5 methylpyrazine, 2-ethyl-3-methylpyrazine, 2,3,5-trimethylpyrazine, 2-ethyl-3,6 dimethylpyrazine, 2-ethyl-3,5-dimethylpyrazine, and 2,3-diethyl-5-methylpyrazine,
wherein the sum of the absolute content of 2-ethyl-6-methylpyrazine, 2-ethyl-5-methylpyrazine, 2-ethyl-3 methy 1 pyrazine, 2,3,5-trimethy 1 pyrazine, 2-ethy 1-3,6-dimethy 1 pyrazine, 2-ethy 1-3,5 dimethy 1 pyrazine, and 2,3-diethyl-5-methylpyrazine is greater than or equal to 50.0 mg/kg of soluble coffee solids of the coffee composition.

3. The coffee composition of claim 1 wherein the absolute content of the furfuryl alcohol is greater than or equal to 2,000 mg/kg of soluble coffee solids of the coffee composition.

4. The coffee composition of claim 1 further comprising one or more of 2-acethylthiazole, 2-acetylpyrazine, and 2-acetylpyridine,
wherein the sum of the absolute content of 2-acethylthiazole, 2-acetylpyrazine, and 2-acetylpyridine is greater than or equal to 2.70 mg/kg of soluble coffee solids of the coffee composition.

5. The coffee composition of claim 1 further comprising 2,3-butanedione, wherein a ratio of concentrations of the furfurylalcohol to the 2,3-butanedione is greater than or equal to 30.

6. The coffee composition of claim 1 wherein the one or more monosaccharides comprise galactose in an amount greater than or equal to 8 wt. % based on the dry weight of the coffee composition.

7. The coffee composition of claim 1 wherein the one or more monosaccharides comprise mannose in an amount greater than or equal to 8 wt. % based on the dry weight of the coffee composition.

8. The coffee composition of claim 1 further comprising 2-acetylpyrazine and (E)-β-damascenone,
wherein a ratio of concentrations of 2-acetylpyrazine to (E)-β-damascenone is greater than or equal to 40.

9. A coffee composition comprising one or more monosaccharides in an amount greater than or equal to 18 wt. %; and one or more alkylpyrazines having an absolute content greater than or equal to 50.0 mg/kg of soluble coffee solids, furfuryl alcohol having an absolute content greater than or equal to 2,000 mg/kg of soluble coffee solids, or one or more N-heterocycles greater than or equal to 2.70 mg/kg of soluble coffee solids.

10. The coffee composition of claim 9 comprising pyridine, wherein a ratio of concentrations of the furfurylalcohol to the pyridine is greater than or equal to 30.

11. The coffee composition of claim 9 further comprising 2,3-butanedione, wherein a ratio of concentrations of the furfurylalcohol to the 2,3-butanedione is greater than or equal to 30.

12. The coffee composition of claim 9 wherein the one or more monosaccharides comprise galactose in an amount greater than or equal to 8 wt. % based on the dry weight of the coffee composition.

13. The coffee composition of claim 9 wherein the one or more monosaccharides comprise mannose in an amount greater than or equal to 8 wt. % based on the dry weight of the coffee composition.

14. The coffee composition of claim 9 further comprising 2-acetylpyrazine and (E)-β-damascenone,
wherein a ratio of concentrations of 2-acetylpyrazine to (E)-β-damascenone is greater than or equal to 40.

15. The coffee composition of claim 9 wherein the coffee composition is a liquid concentrate or a soluble powder.

* * * * *